Patented Aug. 3, 1926.

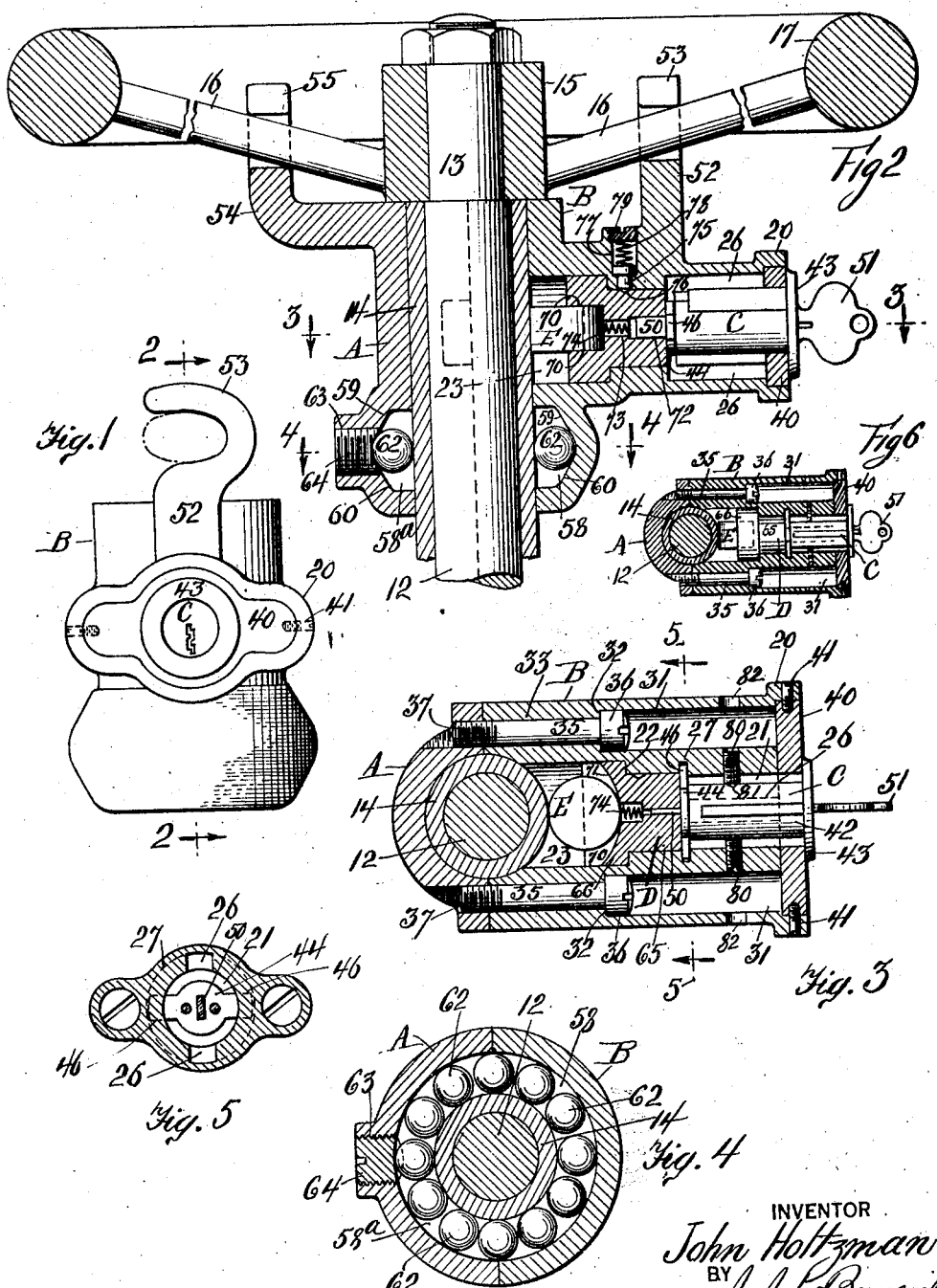

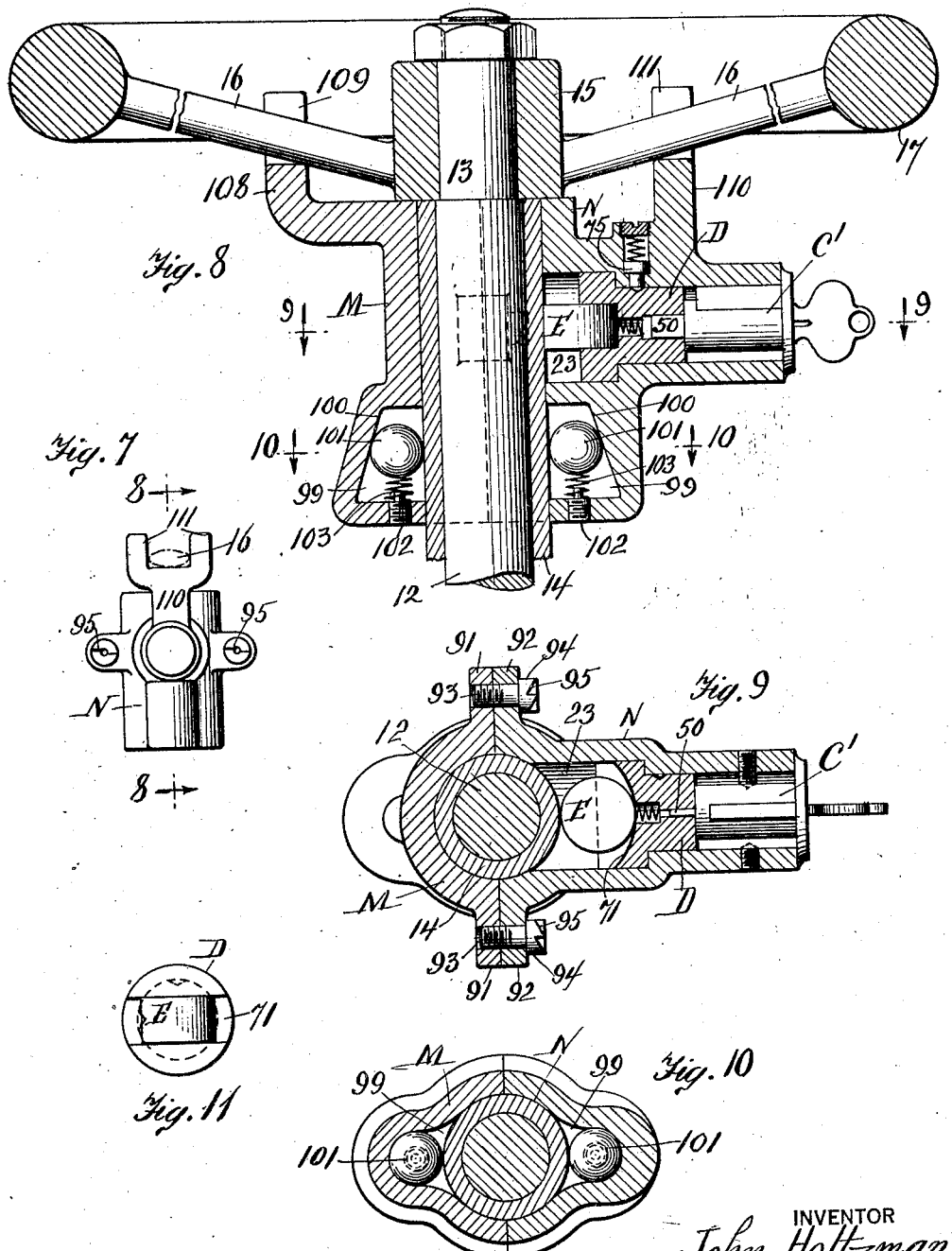

1,594,524

UNITED STATES PATENT OFFICE.

JOHN HOLTZMAN, OF NEW YORK, N. Y.

STEERING-POST LOCK.

Application filed March 9, 1922. Serial No. 542,283.

This invention relates to a steering post lock, that is particularly adapted to the steering post of an automobile and various other vehicles.

Its object is the production of a lock that will prevent the unauthorized operation and running of the vehicle.

A second object of the lock is to be enabled to clamp it in operative position, without mutilating the steering post or any other portions of the vehicle to which it is applied.

A third object of the invention is to be able to lock the steering post and its wheel in any angular position, to right or left.

A fourth object of the invention is the production of a steering post lock which cannot be removed from the steering post, without unlocking the key mechanism of the lock.

A fifth object of the invention is the production of a steering post lock that is automatically clamped, at a predetermined location on the steering post.

A sixth object of the invention is the production of a steering post lock, that can be removed from the steering post without injury thereto or to the post.

A seventh object of the invention is the production of a steering post lock, that clamps the steering wheel of the post and prevents its unauthorized removal.

An eighth object of the invention is the production of a steering post lock, that is clamped to its post in roller bearing relation thereto.

A ninth object of the invention is the production of means to lock a pair of rotatable concentric members together.

Other objects will be evident from the following description and claims.

In the accompanying drawings Fig. 1 represents a front elevation of an exemplification of the automobile steering post lock; Fig. 2 shows a section of Fig. 1 on the line 2, 2; Fig. 3 indicates a section of Fig. 2 on the line 3, 3; Fig. 4 represents a section of Fig. 2 on the line 4, 4; Fig. 5 shows a section on a reduced scale, of Fig. 3 on the line 5, 5; Fig. 6 shows a section similar to Fig. 3, on a reduced scale with some of the elements in a different position; Fig. 7 represents a front elevation of a modification of the lock; Fig. 8 shows an enlarged section of Fig. 7 on the line 8, 8; Fig. 9 indicates a section of Fig. 8 on the line 9, 9; Fig. 10 is a section of Fig. 8 on the line 10, 10 and Fig. 11 indicates an elevation of some details.

A steering post 12 of an automobile is shown with its reduced portion 13 and the sleeve 14. A steering wheel comprises the hub 15, arms 16 and the rim 17.

The lock is indicated with a casing comprising the members shown respectively in their entireties by the letters A and B. The member B has formed therewith the recessed flange 20, and the central opening 21 shouldered at 22 for the chamber 23. Longitudinal cavities 26 are formed with the outer end of the opening 21. An annular recess 27 extends from the opening 21 into the wall thereof. Bolt holes 31 are formed in the member B and are shouldered at 32 for the smaller holes 33. Bolts 35 are located in the holes 33, and are shown with the heads 36 and the threaded ends 37. The ends 37 in threaded engagement with threaded openings in the member A, and the heads 36 bear against the shoulders 32. A cap 40 is provided for the outer end of the member B and is located in the recessed flange 20. Screws 41 extend through the flange 20 and engage the cap 40. A lock indicated in its entirety by the letter C, comprises the casing 42, that has formed therewith the outer flange 43. At the inner end of the casing 42 is shown the rotating disc flange 44, which has formed therewith the locking lugs 46, which extend into the recess 27. A locking bar 50 extends from the lock C, turns with the flange 44 and its coacting elements of the lock. The key of the lock is shown at 51. A supporting and locking arm 52, having the hook end 53, extends from the member B, and a similar locking arm 54 with the hook end 55 extends from the member A. The hook ends 53 and 55 engage a pair of the arms 16. In the lower portions of the members A and B are respectively formed the cavities 58 and 58$^a$. Said cavities have the upper inwardly flaring walls 59 and the lower inwardly flaring walls 60.

Roller bearing balls 62 are located in the cavities 58, 58$^a$. A threaded opening 63 in the member A connects with the cavity 58$^a$ thereof and has in engagement therewith the threaded stud 64.

A rotatable plug is indicated in its entirety by the letter D, and comprises the cylindrical portion 65 with the enlarged cylindrical portion 66. The portion 66 has formed therein the cavity with the parallel walls 70, and a circular bottom wall 71 eccentric to the sleeve 14, and struck with a radius shorter than its distance from the longitudinal axis of said sleeve 14. A rectangular opening 72 is formed in the portion 65, which joins with the cylindrical opening 73 therein. The locking bar 50 of the lock C extends into the rectangular opening 72. A locking roller E is located in the chamber 23 and extends into the cavity having the walls 70 and 71 of the portion 66 of the plug D. A spring 74 is located in the opening 73 and bears against the locking roller E. A clamping plug 75 with the tapered end 76 is located in an opening 77 of the member B.

A spring 78 is shown in the opening 77 and bears between the clamping plug 75 and the screw plug 79 in threaded engagement with the upper end of the opening 77. The end 76 of the plug 75 is adapted to engage an indentation in the wall of the plug D. Set screws 80 are located in threaded openings in the member B, and have pointed ends 81 which engage indentations in the lock C to hold it in place. Openings 82 are shown in the member B to locate the screws 80 in place.

To locate the steering post lock in place, the members A and B are separated, by unscrewing the bolts 35 and are then located around the sleeve 14, with the hook ends 53 and 55 engaged with the arms 16 of the steering wheel. The members A and B are then clamped to each other and to the sleeve 14 by means of the bolts 35 in any radial position relative to the post 12. The roller bearing balls 62, will prevent the members A and B moving in a vertical direction, by reason of their contact with the flaring walls 59 and 60. When the lock C with its locking bar 50 is located as shown in Figs. 2, 3 and 5, the plug D locates the locking roller E as shown in said figures, with its cylindrical surface bearing against the outer surface of the sleeve 14 and the circular bottom wall 71 of the plug D, which latter is eccentric with said sleeve and struck with radius smaller than its distance from the axial center of the sleeve 14 as already referred to. Should it now be attempted to rotate the post 12 the said locking roller E will be jammed between the outer surface of the sleeve 14 and the wall 71 of the cavity in the plug D, and the steering post will be locked in position and unable to be turned. When the lock C is turned to the position shown in Fig. 6 the cylindrical wall of the locking roller E will be located as shown in said figure, with its longitudinal axis at right angles to the longitudinal axis of the post 12. In this position the said roller E is not jammed and the post 12 can turn. When the roller E locks the post 12 in position, the locking lugs 46 are turned out of line with the cavities 26, and being in the recess 27 prevents the lock C and the cap 40 being removed, by reason of which the bolts 35 cannot be unscrewed to separate the members A and B.

Referring to the modification shown in Figs. 7 to 11, the steering post 12 is again shown with its reduced portion 13 and the sleeve 14. The hub 15 of the steering wheel is indicated with its arms 16 and rim 17.

The lock is indicated with a casing comprising the members M and N. The members M and N have respectively formed therewith the flanges 91 and 92, that are connected by the screws 93. Each of the said screws is provided with a head 94 having clutch shaped teeth 95 formed therewith. These screws can be tightened in position with an ordinary screw driver but cannot be unscrewed thereby. Each of the members M and N has formed therewith a cavity 99 with the upwardly flaring walls 100 for the roller bearing balls 101. Screws 102 engage openings in the bottom walls of the cavities 99 and springs 103 bear between the upper ends of the screws 102 and the ball bearings 101. The ball bearings prevent the members M and N lowering by reason of becoming jammed between the walls 100 and the outer surface of the sleeve 14, if any attempt is made to lower said members when clamped to the sleeve 14. The member M has an arm 108 with the forked end 109 which engages one of the arms 16, and the member N has a similar arm 110 with the forked end 111 which engages one of the other arms 16. The member N is shown with the cavity 23, plug D, locking roller E, lock C' similar to C but devoid of the lugs 46, locking bar 50, clamping plug 75 as already explained. The operation of the modified form of the steering post lock is similar to that already explained.

Instead of the circular bottom wall 71, said wall may be made of other curvature which approaches the sleeve 14 as it extends from its central portion, or the wall may be flat inclining from its central portion toward the longitudinal axis of the post 12.

For the roller E a ball may be substituted.

Various modifications may be made in the invention and the present exemplification is to be taken as illustrative and not limitative thereof.

Having described my invention what I desire to secure by Letters Patent and claim is:

1. In a steering post lock adapted to coact with the stationary sleeve of a steering post, the combination of a rotatable plug in the lock having a wall eccentric with said sleeve, an element interposed between said sleeve and said eccentric wall, means to turn said plug with said element, a steering wheel for the steering post, and means to engage the wheel to hold the same against rotation.

2. In a steering post lock adapted to coact with the stationary sleeve of a steering post for a vehicle, the combination of a rotatable plug in the lock having a wall that inclines from its central portion toward said sleeve, an element interposed between said wall and said sleeve, means to turn the plug with said element, a steering wheel for the steering post and means to engage said wheel to hold the same against rotation.

3. In a steering post lock adapted to coact with the stationary sleeve of a steering post for a vehicle, the combination of members for the lock adapted to be clamped in any radial position to said sleeve to engage the wheel of the steering post in any radial position, a movable element in the lock, means to locate said element to jam with the sleeve when a force is applied to the steering post to turn the same and means to engage said wheel to hold the same against rotation.

4. In a steering post lock adapted to coact with the stationary sleeve of a steering post for a vehicle, the combination of a casing having a cavity with an upper inwardly flaring wall and a lower inwardly flaring wall, roller bearing balls in said cavity to lock the casing with said sleeve with a movement of the casing along the longitudinal axis of the sleeve, a steering wheel fastened to the steering post and means to engage the steering wheel to hold the same against rotation.

5. In a steering post lock adapted to coact with the stationary sleeve of a steering post for a vehicle the combination of a casing, a key actuated rotatable plug in said casing having a cavity with a wall converging from its central portion toward said sleeve, a movable element located in said cavity, bearing against said sleeve and said wall and jamming therewith with any turning movement of said steering post when the element is located in its jammed position by said rotatable plug, a steering wheel for the steering post and means to engage the steering wheel to hold the same against rotation.

6. In combination a cylindrical element, a second element around the cylindrical element, a wedging cylindrical element contained in the second element and key operated means in the second element to lock the cylindrical element against rotation with said wedging element.

7. In combination a cylindrical element, a second element around the cylindrical element, a wedging cylindrical element contained in the second element, key operated means in the second element to lock the cylindrical element against the rotation with said wedging element and means to maintain said cylindrical and second elements in their respective positions at right angles to their longitudinal axes.

Signed at the borough of Manhattan, city of New York in the county of New York and State of New York this 6th day of March A. D. 1922.

JOHN HOLTZMAN.